United States Patent [19]

Farr, Jr.

[11] Patent Number: 4,655,479
[45] Date of Patent: Apr. 7, 1987

[54] PRE-SET TORQUE LIMITER SUB

[75] Inventor: Albert P. Farr, Jr., Houston, Tex.

[73] Assignee: Hughes Tool Company - USA, Houston, Tex.

[21] Appl. No.: 787,580

[22] Filed: Oct. 15, 1985

Related U.S. Application Data

[63] Continuation-in-part of Ser. No. 573,180, Jan. 23, 1984, abandoned.

[51] Int. Cl.⁴ .............................................. F16L 35/00
[52] U.S. Cl. .......................................... 285/18; 285/92; 285/114; 285/333; 403/299; 411/178; 192/56 R
[58] Field of Search ................. 285/91, 92, 114, 357, 285/392, 333, 334, DIG. 23; 403/41, 299, 342, 343, 60; 411/178, 385; 175/320, 323; 464/45, 18; 192/56 R

[56] References Cited

U.S. PATENT DOCUMENTS

| | | | |
|---|---|---|---|
| 1,414,207 | 4/1922 | Reed | 285/2 |
| 1,610,414 | 12/1926 | Bernard et al. | 285/330 |
| 1,708,378 | 4/1929 | Dale | 464/18 |
| 1,846,348 | 2/1932 | Montgomery | 464/18 |
| 1,855,556 | 4/1932 | Montgomery | 464/18 |
| 2,147,254 | 7/1935 | Hinderlinter | 285/114 X |
| 2,150,221 | 3/1939 | Hinderlinter | 285/114 X |
| 2,273,017 | 2/1942 | Boynton | 285/334 X |
| 2,535,320 | 12/1950 | Richardson | 29/447 |
| 2,636,753 | 4/1953 | Griffin | 29/447 |
| 3,062,568 | 11/1962 | Andresen et al. | 285/392 X |
| 3,204,992 | 9/1965 | Walker | 175/320 |
| 3,586,353 | 6/1971 | Lorenz | 403/343 X |
| 3,754,609 | 8/1973 | Garrett | 175/323 |
| 4,064,953 | 12/1977 | Collins | 175/321 |
| 4,073,511 | 2/1978 | Haas et al. | 285/3 |
| 4,538,838 | 9/1985 | Pringle | 285/91 |

Primary Examiner—Andrew V. Kundrat
Assistant Examiner—Joseph A. Fischetti
Attorney, Agent, or Firm—H. Dennis Kelly

[57] ABSTRACT

A preset torque limiter sub having a pin member and a box member. The pin member is connected to a section of drill pipe and has a male connection at one end. The box member is connected to a second section of drill pipe. The male connection and the female connection are connected together. Whenever the torque on the sub exceeds a selected amount, the pin member and the box member can rotate with respect to one another. However, whenever the torque on the sub is below the selected amount, the pin member and the box member are held rigidly together.

5 Claims, 4 Drawing Figures

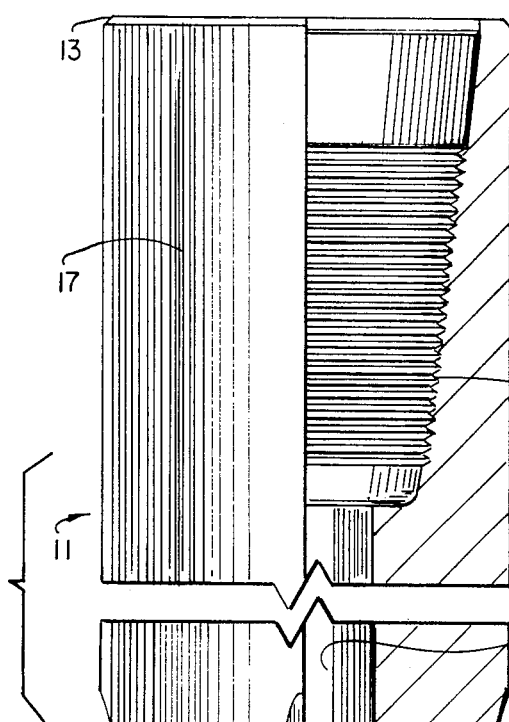
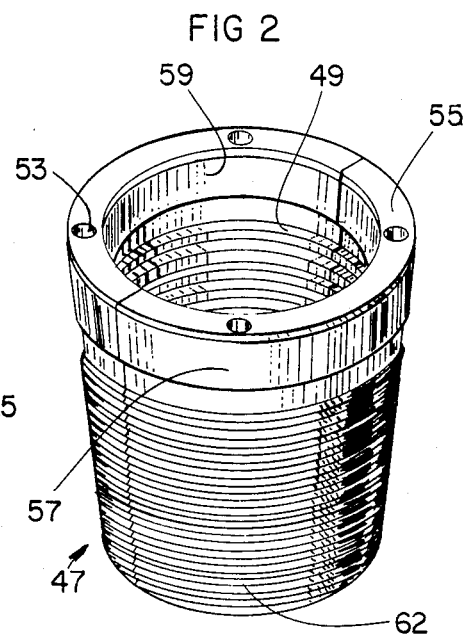
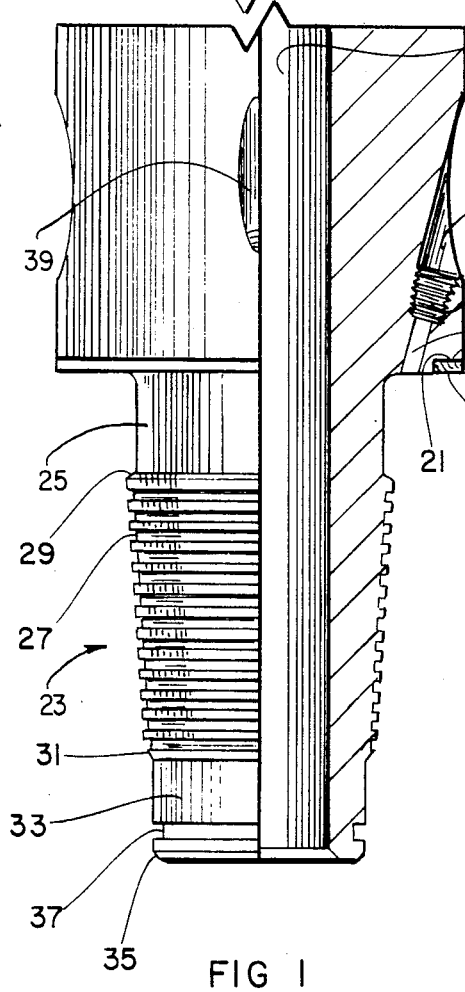
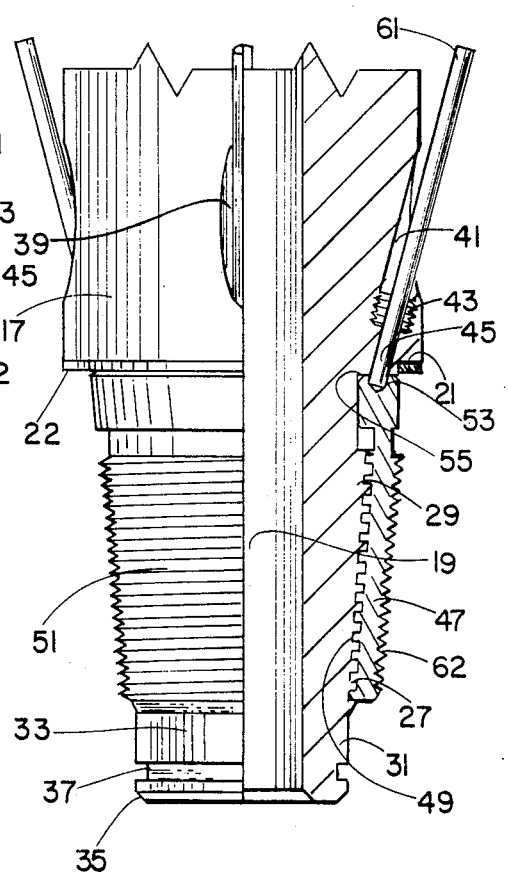
FIG 1  FIG 2  FIG 3

PRE-SET TORQUE LIMITER SUB

REFERENCE TO PARENT APPLICATION

This is a continuation-in-part of application Ser. No. 06/573,180, filed Jan. 23, 1984 now abandoned.

BACKGROUND OF THE INVENTION

1. Field of the Invention

This invention relates in general to shaft couplings, and in particular to connections between pipe sections in a drill string.

2. Description of the Prior Art

Oil and gas wells are drilled with a rock bit, mounted on the bottom of a drill string. A drill string, which may be several miles long, is a series of pipe sections, each about thirty feet long. The upper end of the drill string is rotated by a rotary table, and, as the drill string rotates, the rock bit is rotated to cut into the earth.

During drilling, the torque required to rotate the drill string may suddenly increase for some reason, such as the sides of the hole collapsing. If the torque on the drill string exceeds the makeup torque of the tool joints, downhole makeup may occur, producing additional stress which may exceed the yield strength of the tool joints between pipe sections. The tool joints may be damaged, and may even separate. The drill string must then be removed from the hole, which is a costly, time-consuming, and dangerous operation. If the lower part of the drill string is lost due to separation, an expensive fishing operation must be performed, or the hole may even have to be abandoned.

In order to prevent such damage, safety joints are sometimes inserted into the drill string at various intervals. A safety joint performs as a normal tool joint at normal torque, but when the torque becomes excessive shear pins in the safety joint are sheared and the safety joint becomes a swivel coupling. Such safety joints are described in U.S. Pat. No. 4,064,953 (Collins) and in U.S. Pat. No. 1,414,207 (Reed)

After the shear pins in a safety joint have been sheared by excessive torque, the drill string must be removed from the hole, and the shear pins replaced, before normal rotary drilling can resume. Such an operation is expensive, time-consuming, and dangerous to personnel on the drilling platform.

SUMMARY OF THE INVENTION

The preset torque limiter sub of the invention will prevent damage to the drill string due to excessive torque. However, after the torque is reduced below the excessive level, normal rotary drilling can be resumed without removing the drill string from the hole.

The preset torque limiter sub has a pin member and a box member. The pin member is connected to a section of drill pipe and has a male connection at one end. The box member is connected to a second section of drill pipe and has a female connection at one end. The male connection has horizontal concentric grooves and the female connection has standard threads.

A sleeve is mounted between the male and female connections. Horizontal concentric grooves, on the inner surface of the sleeve, mesh with the grooves on the male connection. The sleeve has standard threads on its outer surface, so that the female connection can be threaded onto the sleeve.

A makeup shoulder on the box member contacts a makeup shoulder on the pin member when the sub has been made up. Frictional contact, between the two makeup shoulders and between the grooves on the sleeve and the male connection, holds the box member and the pin member against relative rotation, as long as the torque on the sub is below a selected amount.

When the torque exceeds the selected amount, the makeup shoulders slip, and the box member and pin member can rotate with respect to one another. The horizontal grooves on the sleeve and on the male connection hold the box member and pin member together axially, even while there is relative rotation.

When the torque is reduced to below the selected amount, the makeup shoulders once again hold the box member and the pin member against relative rotation. Drilling can then resume, without the necessity of removing the drill string from the hole.

BRIEF DESCRIPTION OF THE DRAWINGS

FIG. 1 is a side view, partially in section, of the pin member.

FIG. 2 is a perspective view of the sleeve, or split ring insert.

FIG. 3 is a side view, partially in section, of the pin member, the split ring insert, and the shot pins.

DESCRIPTION OF THE PREFERRED EMBODIMENT

Figure 4:
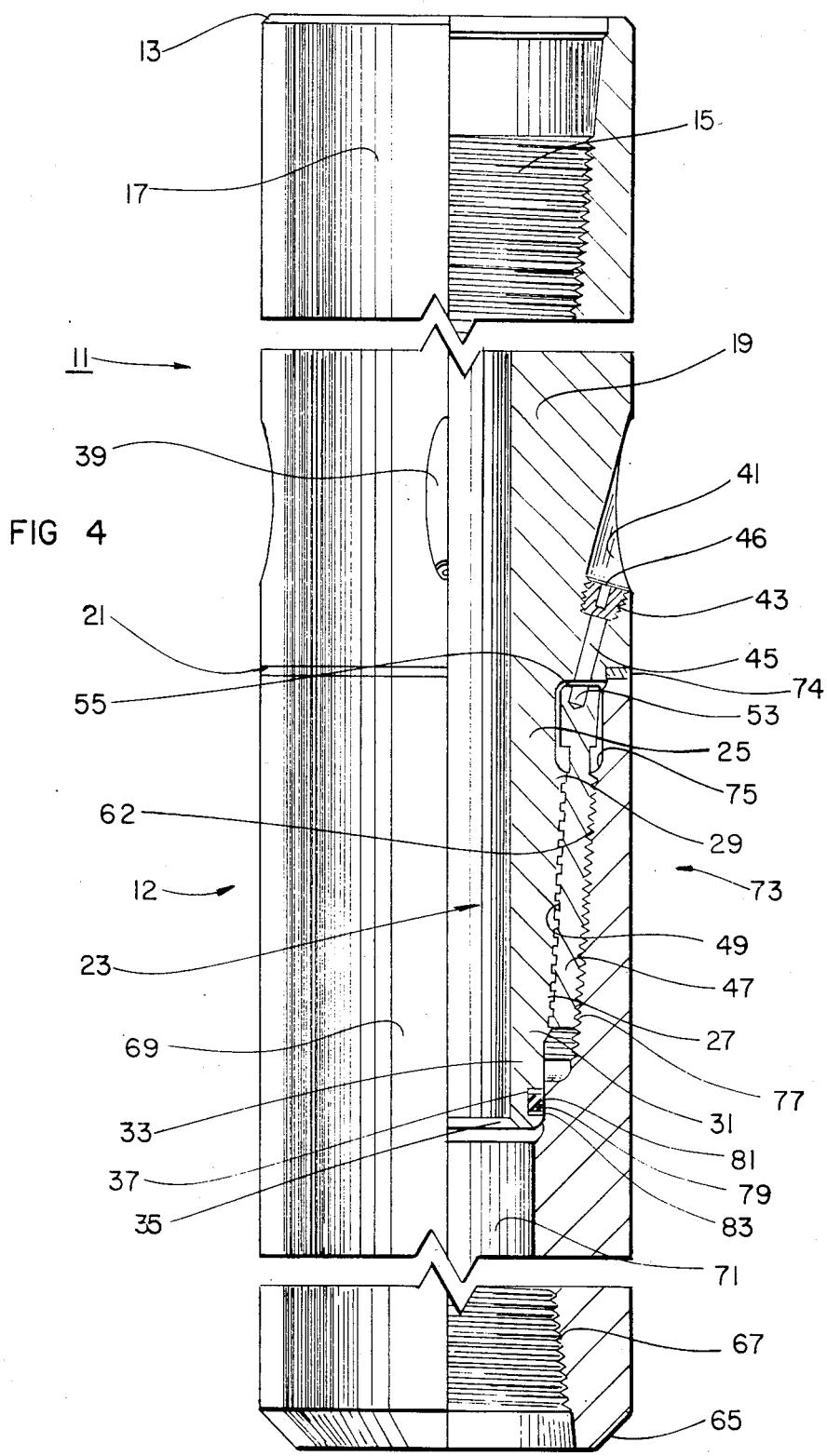
FIG. 4 is a side view, partially in section, of the preset torque limiter sub.

The preset torque limiter sub is a tubular coupling having a pin member 11 and a box member 12. FIG. 1 illustrates the preferred embodiment of the pin member 11. The pin member 11 has a beveled upper end 13, and a standard threaded connection 15 for connection to the lower end of a section of drill pipe (not shown). The pin member 11 has a cylindrical outer surface 17 and a cylindrical bore 19, which have the same diameters as the outer surface and the bore of the drill string, respectively.

A shoulder ring 21 is located at the lower edge of the cylindrical outer surface 17. The lower surface of the shoulder ring 21 forms an annular makeup shoulder 22 for the pin member 11. The shoulder ring 21 is made of hardened steel to prevent galling.

Below the shoulder ring 21, the pin member 11 has a male connection 23. The male connection 23 has a cylindrical section 25, and a plurality of horizontal concentric grooves 27. The grooved section 27 of the male connection 23 tapers slightly from the upper end 29 of the grooved section 27 to the lower end 31. Below the grooved section 27, the male connection 23 has a cylindrical nose 33. The nose 33 is beveled on the lower end 35, and has an annular seal groove 37.

The pin member 11 has four holes 39, evenly spaced around the outer surface 17. Each hole 39 slants downwardly from the outer surface 17 of the pin member 11, and exits between the shoulder ring 21 and the cylindrical section 25 of the male connection 21. Each hole 39 has a cylindrical section 41 at the top, a threaded section 43 in the middle, and a smaller cylindrical section 45 at the bottom. After the sub has been made up, a dry seal plug 46 is inserted into the threaded section of each hole 39 in the pin member 11, as shown in FIG. 4.

A sleeve 47 is mounted onto the male connection 23, as illustrated in FIG. 3. The preferred embodiment of the sleeve 47 is a split ring insert 47, as shown in FIG. 2. The insert 47 generally has the shape of a hollow frustum, tapering inwardly from top to bottom. At the top of the insert 47, the outer diameter of the insert 47 is approximately equal to the inner diameter of the shoulder ring 21.

The insert 47 has standard threads 62 on its outer surface. On its interior surface, the insert 47 has horizontal concentric grooves 49, which mesh with the concentric grooves 27 on the male connection 23. The insert 47 can thus rotate with respect to the male connection 23 without any relative axial movement.

There are four dowel holes 53 spaced evenly in the upper surface 55 of the insert 47. These holes 53 can be aligned with the lower cylindrical sections 45 of the holes 39 in the pin member 11. Shot pins 61 fit through the holes 39 in the pin member 11, and extend downwardly into the dowel holes 53 in the split ring insert 47. These shot pins 61 are a retention means for holding the split ring insert 47 against rotational movement relative to the male connection 23 during the makeup of the torque limiter sub.

The preferred embodiment of the box member 12 is illustrated in FIG. 4. The box member 12 has a beveled lower end 65, and a standard threaded connection 67 for connection to the upper end of a section of drill pipe (not shown). The outer surface 69 of the box member 12 is the same diameter as the outer surface 17 of the pin member 11 and the outer surface of the drill string. The bore 71 of the box member 12 is slightly larger than the bore 19 through the pin member 11.

At the upper end of the box member 12 is a female connection 73. At the top of the female connection 73 is an annular makeup shoulder 74, which contacts the makeup shoulder 21 on the pin member 11 when the pin member 11 and the box member 12 are threaded together. Directly below the makeup shoulder 74, the female connection 73 has a cylindrical section 75, which has an inner diameter slightly larger than the outer diameter of the split ring insert 47.

Below the cylindrical section 75 the female connection 73 has standard interior threads 77. The threads 77 taper slightly inward from top to bottom Below the threads 77, the female connection 73 has another cylindrical section 79, which has an inner diameter slightly larger than the outer diameter of the nose 33 on the male connection 23. An O-ring 81 and a pair of backup rings 83 are located in the seal groove 37 between the male connection 32 and the female connection 73.

In operation, several preset torque limiter subs are placed between pairs of pipe sections in the drill string, in order to prevent damage to the tool joints in the drill string due to excessive torque. The pin member 11 is connected to the lower end of a pipe section and the box member 63 is connected to the upper end of a second pipe section. The split ring insert 47 is placed over the male connection 23, so that the horizontal concentric grooves 49 on the insert 47 mesh with the horizontal concentric grooves 27 on the male connection 23. Shot pins 61 are inserted through the holes 39 in the pin member 11 into the dowel holes 53 in the split ring insert 47. The O-ring 81 and backup rings 83 are placed within the seal groove 37 in the male connection 23, and the shoulder ring 21 is placed over the male connection 23. The preset torque limiter sub is then prepared for makeup.

While the shot pins 61 hold the insert 47 against rotation with respect to the male connection 23, the box member 12 and the pin member 11 are threaded together. The threads 77 on the female connection 73 mate with the threads 51 on the insert 47. The torque which is applied to the torque limiter sub in order to make up the members, is known as the "makeup torque." Once the pin member 11 and the box member 12 have been completely made up, the makeup shoulders 22, 74 contact. The shot pins 61 are then removed from the holes 39, and dry seal plugs 47 are inserted into the threaded sections 43 of the holes 39.

As long as the torque on the drill string is below a selected amount, the torque will be transmitted through the makeup shoulders 22, 74 and the grooves 27, 49. If the torque on the drill string becomes excessive, the makeup shoulders 22, 74 will slip, and the split ring insert 47 and the male connection 23 will rotate with respect to one another. The torque at which slippage will occur is slightly less than the makeup torque. When the torque on the drill string is reduced to below the level at which slippage occurs, slippage will no longer occur, and the drill string can continue drilling. Thus, it is unnecessary to remove the drill string from the hole after an excessive torque has been applied.

The connection means for connecting the female connection 73 and the male connection 23 together includes the threads 51, 77, the split ring insert 47, and the concentric grooves 27, 49. The connection means for connecting the sleeve 47 to the male connection 23 is the concentric grooves 27, 49. The makeup shoulders 22, 74 are a torque limiting means for allowing the box member 12 and the pin member 11 to rotate with respect to one another whenever the torque on the sub exceeds a selected amount, and for holding the box member 12 and the pin member 11 to rotate with respect to one another whenever the torque on the sub exceeds a selected amount, and for holding the box member 12 and the pin member 11 against relative rotation whenever the torque on the sub is below the selected amount. In the preferred embodiment, the compression means for maintaining the pressure between the makeup shoulders is the concentric grooves 27, 49.

I claim:

1. A torque limiter sub, comprising:
   a box member having a female connection at one end and a makeup shoulder;
   a pin member having a male member at one end and a makeup shoulder which contacts the makeup shoulder in the box member;
   a selected one of the female connection and the male connection having threads and the other connection having concentric grooves;
   a split ring insert, located between the female connection and the male connection, said insert having threads and concentric grooves to mate and mesh with said selected ones of said threads and grooves on the female connection and the male connection to hold the female connection and the male connection against rotation with respect to one another whenever the torque on the sub is below a selected amount, but to allow the female connection and the male connection to rotate with respect to one another, without separating axially, whenever the torque on the sub exceeds the selected amount; and
   retention means for holding the insert against rotational movement along the concentric grooves during makeup of the torque limiter sub.

2. A torque limiter sub, comprising:
   a pin member having connection means at one end for connecting the pin member to a section of drill pipe, a makeup shoulder, and a male connection at the other end, said male connection having concentric grooves around the outer surface;

a box member having connection means at one end for connecting the box member to a section of drill pipe, a makeup shoulder, and a female connection at the other end, said female connection having threads on the inner surface;

a split ring insert, located between the male connection and the female connection, said insert having concentric grooves on the inner surface of the insert to correspond to the grooves on the male connection and having threads on the outer surface of the insert to correspond to the threads on the female connection to hold the female connection and the male connection against rotation with respect to one another whenever the torque on the sub is below a selected amount, but to allow the female connection and the male connection to rotate with respect to one another, without separating axially, whenever the torque on the sub exceeds the selected amount; and retention means for holding the insert against rotational movement relative to the male connection during makeup of the torque limiter sub.

3. A torque limiter sub, comprising:

a pin member having connection means at one end for connecting the pin member to a section of drill pipe, a makeup shoulder, and a male connection at the other end, said male connection having concentric grooves around the outer surface;

a box member having connection means at one end for connecting the box member to a section of drill pipe, a makeup shoulder, and a female connection at the other end, said female connection having threads on the inner surface;

a split ring insert, located between the male connection and the female connection, said insert having concentric grooves on the inner surface of the insert to correspond to the grooves on the male connection and having threads on the outer surface of the insert to correspond to the threads on the female connection to hold the female connection and the male connection against rotation with respect to one another whenever the torque on the sub is below a selected amount, but to allow the female connection and the male connection to rotate with respect to one another, without separating axially, whenever the torque on the sub exceeds the selected amount; and a shot pin for holding the insert against rotational movement relative to the male connection during makeup of the torque limiter sub.

4. A torque limiter sub, comprising:

a pin member having connection means at one end for connecting the pin member to a section of drill pipe, a makeup shoulder, and a male connection at the other end, said male connection having concentric grooves around the outer surface;

a box member having connection means at one end for connecting the box member to a section of drill pipe, a makeup shoulder, and a female connection at the other end, said female connection having threads on the inner surface;

a split ring insert located between the male connection and the female connection, said insert having concentric grooves on the inner surface of the insert to correspond to the grooves on the male connection and having threads on the outer surface of the insert to correspond to the threads on the female connection to hold the female connection and the male connection against rotation with respect to one another whenever the torque on the sub is below a selected amount, but to allow the female connection and the male connection to rotate with respect to one another, without separating axially, whenever the torque on the sub exceeds the selected amount; and a plurality of removable shot pins, inserted through holes in the pin member into the split ring insert, for holding the insert against rotational movement relative to the male connection during makeup of the torque limiter sub.

5. A torque limiter sub, comprising:

a pin member having connection means at one end for connecting the pin member to a section of drill pipe, a makeup shoulder, and a male connection at the other end, said male connection having concentric grooves around the outer surface;

a box member having connection means at one ends for connecting the box member to a section of drill pipe, a makeup shoulder, and a female connection at the other end, said female connection having threads on the inner surface;

a split ring insert, generally in the shape of a hollow frustum, located between the male connection and the female connection, said insert having concentric grooves on the inner surface of the insert to correspond to the grooves on the male connection and having threads on the outer surface of the insert to correspond to the threads on the female connection to hold the female connection and the male connection against rotation with respect to one another whenever the torque on the sub is below a selected amount, but to allow the female connection and the male connection to rotate with respect to one another, without separating axially, whenever the torque on the sub exceeds the selected amount;

a plurality of removable shot pins, inserted through holes in the pin member into the split ring insert, for holding the insert against rotational movement relative to the male connection during makeup of the torque limiter sub, said holes being evenly spaced around the circumference of the pin; and a plurality of dry seal plugs for sealing the holes in the pin member after the shot pins have been removed.

* * * * *